(12) United States Patent
Fisch

(10) Patent No.: US 12,352,364 B2
(45) Date of Patent: Jul. 8, 2025

(54) VALVE HOUSING AND METHOD FOR MANUFACTURING A VALVE HOUSING

(71) Applicant: AVS, Ingenieur J.C. Römer GmbH, Grafenau (DE)

(72) Inventor: Rainer Fisch, Hauzenberg (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 0 days.

(21) Appl. No.: 18/145,773

(22) Filed: Dec. 22, 2022

(65) Prior Publication Data

US 2023/0204115 A1    Jun. 29, 2023

(30) Foreign Application Priority Data

Dec. 23, 2021 (EP) .................................... 21217237

(51) Int. Cl.
| | |
|---|---|
| *F16K 27/00* | (2006.01) |
| *B29C 45/44* | (2006.01) |
| *F16K 25/00* | (2006.01) |
| *F16K 31/06* | (2006.01) |
| *B29L 31/00* | (2006.01) |

(52) U.S. Cl.
CPC .......... *F16K 27/00* (2013.01); *B29C 45/4421* (2013.01); *F16K 25/005* (2013.01); *F16K 31/06* (2013.01); *B29L 2031/7506* (2013.01)

(58) Field of Classification Search
CPC ...... F16K 27/00; F16K 31/06; F16K 37/0263; B29C 45/4421
See application file for complete search history.

(56) References Cited

U.S. PATENT DOCUMENTS

| | | | |
|---|---|---|---|
| 6,612,543 B2 * | 9/2003 | Strobel .................. | F16K 31/06 251/129.15 |
| 9,644,354 B2 * | 5/2017 | Warsowe ............ | F16K 27/0263 |
| 2009/0314975 A1 | 12/2009 | Scheibe | |

(Continued)

FOREIGN PATENT DOCUMENTS

| | | |
|---|---|---|
| DE | 1247793 B | 8/1967 |
| DE | 2037774 A1 | 2/1972 |

(Continued)

OTHER PUBLICATIONS

Office Action mailed Dec. 27, 2023, in corresponding Japanese application No. 2022-205175, filed Dec. 22, 2022, 9 pages.

(Continued)

*Primary Examiner* — Michael R Reid
(74) *Attorney, Agent, or Firm* — Christensen O'Connor Johnson Kindness PLLC

(57) ABSTRACT

A valve housing for a fluid valve having at least one fluid channel through which a fluid can flow is provided. The valve housing can have a receiving space for a valve closing body movable in the valve housing, the receiving space having an opening, via which the valve closing body is introduced into the receiving space of the valve housing, and at least one first valve seat being formed in the receiving space and projecting into the receiving space in such a way that at least one undercut is formed in the receiving space by the first valve seat, and the valve housing being an integral injection-molded part, the at least one valve seat being produced integrally with the valve housing by an injection molding process.

12 Claims, 3 Drawing Sheets

(56) References Cited

U.S. PATENT DOCUMENTS

| | | | |
|---|---|---|---|
| 2011/0132475 A1 | 6/2011 | Eidenschink et al. | |
| 2011/0210277 A1* | 9/2011 | Bender | H01F 7/1607 251/129.01 |
| 2013/0327973 A1 | 12/2013 | Maier | |
| 2016/0201821 A1* | 7/2016 | Zbinden | F16K 1/04 251/319 |

FOREIGN PATENT DOCUMENTS

| | | |
|---|---|---|
| DE | 4139947 A1 | 6/1993 |
| DE | 19729828 B4 | 7/2006 |
| JP | S5821067 A | 2/1983 |
| JP | 2000117843 A | 4/2000 |
| JP | 2009535008 A | 9/2009 |
| JP | 2013540236 A | 10/2013 |
| WO | 2007/124826 A1 | 11/2007 |

OTHER PUBLICATIONS

Search Report mailed Jun. 29, 2022, issued in corresponding European Application No. 21217237.3, filed Dec. 23, 2021, 13 pages.
Office Action mailed Apr. 19, 2024, in corresponding Japanese application No. 2022-205175, filed Dec. 22, 2022, 9 pages.
Office Action mailed May 31, 2024, in corresponding European application No. 21 217 237.3, filed Dec. 12, 2023, 9 pages.

\* cited by examiner

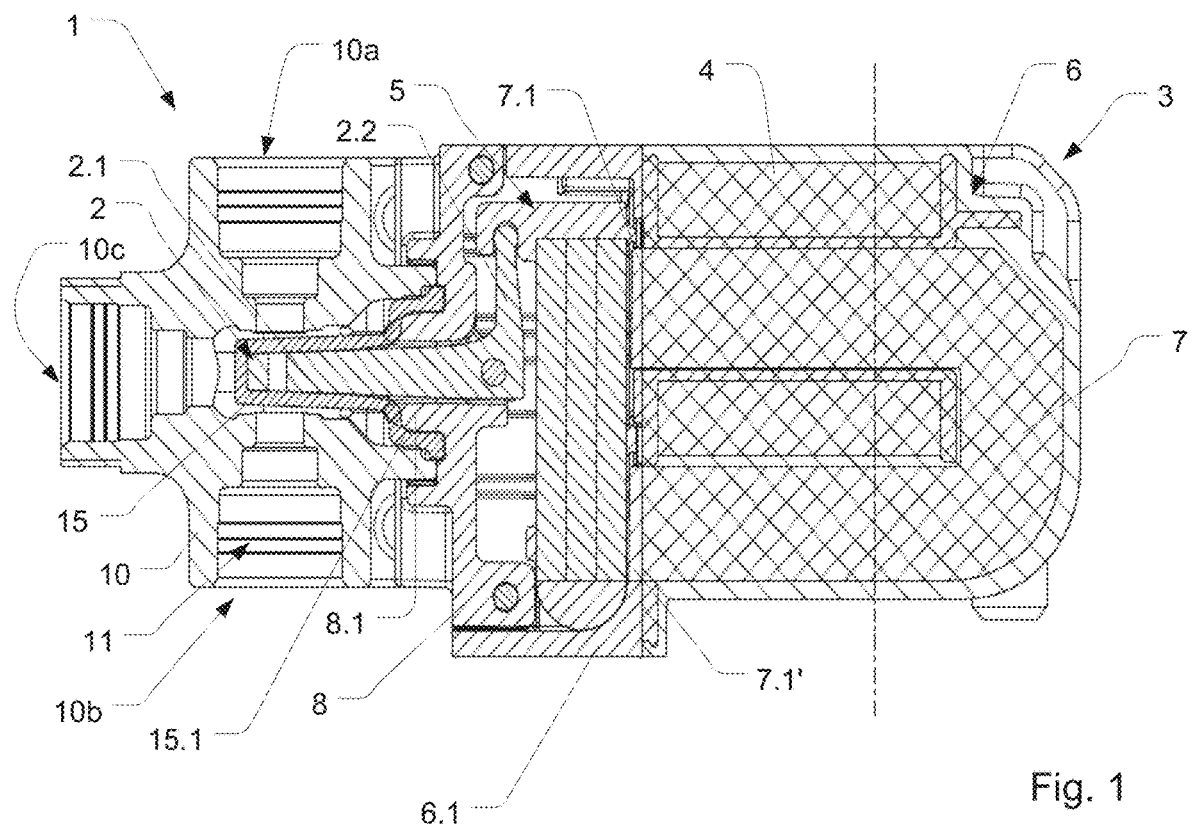
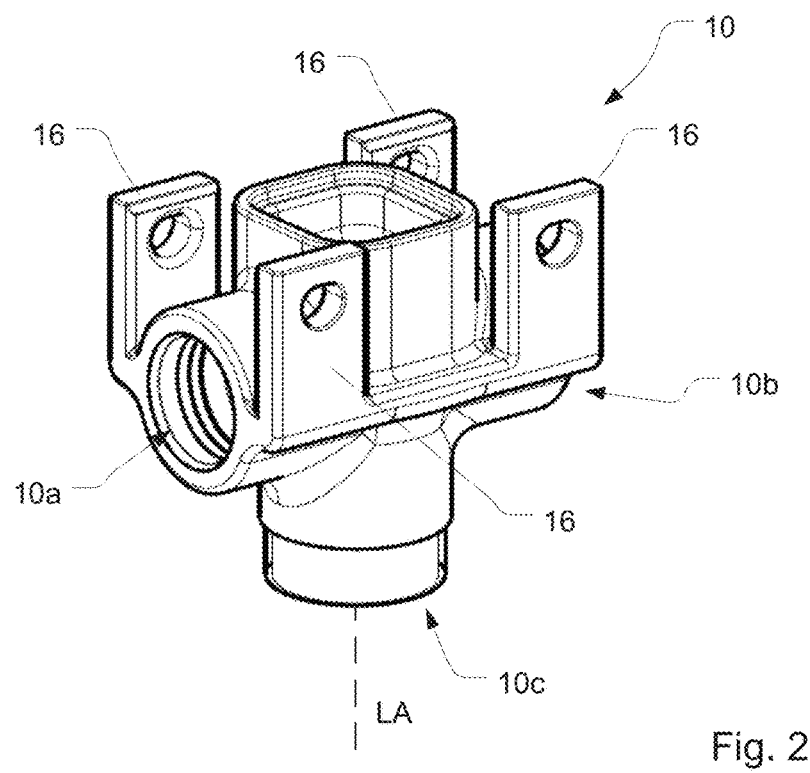

VALVE HOUSING AND METHOD FOR MANUFACTURING A VALVE HOUSING

CROSS-REFERENCE TO RELATED APPLICATION

This application claims priority to European Application Number 21217237.3, filed Dec. 23, 2021, the disclosure of which is hereby incorporated by reference.

FIELD

The present disclosure relates to a valve housing, a fluid valve having a valve housing, and a method for manufacturing a valve housing.

BACKGROUND

Fluid valves for controlling a fluid flow are known in principle. In this case, the fluid is in particular a liquid. Fluid valves of this type are used in particular in the food sector, for example in water dispensers, coffee machines, etc.

Fluid valves of this type have a valve housing in which at least one fluid channel is formed. A valve closing body is provided in the valve housing and is moved by a drive unit, in particular pivoted about a pivot axis. Due to the pivoting, a sealing diaphragm can be pressed against a valve seat in order to control the fluid flow through the fluid valve.

A major disadvantage of known fluid valves is that the valve seat is formed by a component that is independent of the valve housing and is inserted or screwed into the valve housing. Since the installation position of the valve seat can vary due to the insertion or screwing in, it is necessary to adjust the position of the valve seat after manufacturing in such a way that a desired closing behavior of the fluid valve is achieved. On the one hand, this is time-consuming and thus expensive and, on the other hand, the functional quality of the fluid valve crucially depends on the adjustment accuracy provided by the respective workman so that the functional quality of the fluid valve can be subject to undesirable fluctuations.

SUMMARY

Based on this, an object of the present disclosure is to provide a valve housing which can be manufactured inexpensively and has a highly accurate closing behavior with low manufacturing fluctuations.

According to one aspect, a valve housing for a fluid valve is disclosed. The valve housing comprises at least one fluid channel through which a fluid can flow and a receiving space for a valve closing body which can be moved, in particular pivoted, in the valve housing. The receiving space has an opening via which the valve closing body is introduced into the receiving space of the valve housing. A longitudinal axis of the receiving space extends through the opening, in particular runs perpendicular or essentially perpendicular to the plane of the rim of the opening. At least a first valve seat is formed in the receiving space and projects into the receiving space. Specifically, the first valve seat protrudes into the receiving space in a direction transverse, in particular perpendicular or essentially perpendicular to the longitudinal axis of the receiving space. Due to this projection of the first valve seat, at least one undercut is formed in the receiving space. The valve housing is an integral injection-molded part, the at least one valve seat being integrally formed with the valve housing by an injection molding process. In other words, the valve seat is not inserted or screwed into the valve housing as a separate component, but is a direct component of the valve housing and is thus manufactured integrally with the valve housing and is inseparably connected thereto.

The technical advantage of the valve housing is that the production of the at least one valve seat by the injection molding process results in no or reduced build-up tolerances so that an adjustment of the fluid valve is no longer necessary. As a result, the spread of the closing behavior of the fluid valve can be reduced. In addition, the assembly effort is reduced so that a simpler and more cost-effective production of the fluid valve is possible.

According to one exemplary embodiment, either a second valve seat or a stop for the valve closing body is diametrically opposite to the first valve seat in the receiving space. Thus, the pivoting movement of the valve closing body can be limited by the pair of opposing valve seats or the valve seat and the opposing stop. In particular, this limitation of the pivoting movement is used to also achieve a limitation of the pivotable or shiftable armature of a magnetic drive unit so that this armature also no longer needs to be adjusted with respect to its pivoting angle or displacement path.

According to one exemplary embodiment, the second valve seat or the stop for the valve closing body projects into the receiving space in such a way that at least one undercut is formed in the receiving space by the second valve seat or the stop. The projection of the valve seat has the advantage that the valve closing body or the sealing diaphragm located thereon comes in abutment against the valve seat so that the closing behavior of the fluid valve is improved. In addition, the undercut can ensure a sufficiently large fluid channel cross-section between the respective ports of the fluid valve.

According to one exemplary embodiment, the undercut is provided at a lower region of the receiving space that faces away from the opening of the receiving space. This decisively improves the flow around the free end of the valve closing body since the fluid channel cross-section is enlarged by the undercuts.

According to one exemplary embodiment, the first and/or second valve seat has an annular elevation which forms a planar abutment surface for a sealing diaphragm that partially surrounds the valve closing body. An annular sealing edge is provided on the elevation and projects axially into the receiving space. In other words, the sealing edge projects beyond the planar abutment surface in the direction of the valve closing body or the sealing diaphragm located thereon. The annular elevation forms a planar support for the sealing diaphragm and thus a stop that restricts the pivotability of the valve closing body. The sealing edge projecting from the annular elevation is pressed into the sealing diaphragm when the sealing diaphragm abuts against the annular elevation, and thus provides a high tightness of the fluid valve.

According to one exemplary embodiment, the sealing edge is provided at the radial inner edge of the annular elevation. As a result, the sealing edge is located directly at the valve opening. This is advantageous because this minimizes the area in which the fluid exerts pressure on the valve closing body, and thus maximizes the fluid pressure at which the fluid valve can be switched by the drive unit.

According to one exemplary embodiment, the edge of the opening of the receiving space forms a radial sealing surface provided for the abutment of a base area of a sealing diaphragm used to seal the opening to the outside. In this case, the sealing diaphragm can be an integral sealing diaphragm that also encloses the free-end side of the valve closing body. In some embodiments, the edge of the opening of the receiving space forms an outer radial sealing surface against which the base area of the sealing diaphragm abuts on the outer circumferential side. On the inner circumferential side, an extension of the drive unit of the fluid valve can cause the sealing diaphragm to be pressed against the outer radial sealing surface. In particular, the extension of the drive unit can be an extension on a valve housing carrier, which is used to couple the valve housing to the drive unit. This provides a secure seal between the valve housing and the drive unit.

According to one exemplary embodiment, the opening has a rotationally asymmetric circumferential shape. The rotational asymmetry ensures that, on the one hand, the drive unit must be applied to the valve housing in a predetermined orientation and, on the other hand, the sealing diaphragm can also only be inserted into the valve housing in a defined rotary position so that the orientation thereof relative to the at least one valve seat is defined. In this way, assembly inaccuracies that lead to a reduced sealing quality of the fluid valve can be reduced.

According to one exemplary embodiment, the valve housing comprises coupling portions by means of which the valve housing can be detachably attached to a drive unit by means of which the valve closing body can be moved. Thereby assembling of the fluid valve is simplified. In some embodiments, the coupling portions are configured in such a way that the valve housing can only be arranged on the drive unit in a predetermined position or orientation.

According to one exemplary embodiment, the coupling portions are configured for attaching the valve housing to the drive unit by means of a snap mechanism. This allows the valve housing to be easily mounted at the drive unit without the need for tools.

According to one exemplary embodiment, the valve housing has at least one support for a hose quick coupling. A hose quick coupling, for example, can be screwed or pressed into this support. The hose quick coupling can be designed in particular to accommodate a free end of a fluid hose and to secure it against undesired detachment by means of a fixing device, for example barbs engaging in the hose wall. In this way, rapid coupling of a hose to the fluid valve can be achieved.

According to a further aspect, a fluid valve is disclosed. The fluid valve comprises a valve housing and a magnetic drive unit for a valve closing body movable in the valve housing. The valve housing is configured according to any one of the preceding exemplary embodiments.

According to yet another aspect, a method for manufacturing a valve housing for a fluid valve is disclosed. The fluid valve has at least one fluid channel through which a fluid can flow, and a receiving space for a valve closing body movable in the valve housing. In this regard, the manufacturing method comprises the following steps:
  providing an injection mold;
  providing at least a first and second core, the cores being configured to form portions of at least one fluid channel in the valve housing;
  providing a collapsing core for forming the receiving space, the collapsing core having at least one recess for producing at least one valve seat in the receiving space;
  introducing the first and second core and the collapsing core into the injection mold, at least the first core interacting with the collapsing core in such a way that the free end of the first core is oriented towards the recess of the collapsing core;
  introducing a flowable molding material into the injection mold; and
  removing the first and second core as well as the collapsing core from the injection mold.

The valve housing produced by the injection molding method includes at least one valve seat projecting into the receiving space, namely in such a way that at least one undercut is formed in the receiving space by the valve seat.

The manufacturing method offers the technical advantage that the valve housing, which is formed as an injection molded part, renders possible a very precise operation of the fluid valve since the valve housing, including the at least one valve seat, can be manufactured very precisely and accurately, and thus a high repeating accuracy of the fluid valve is achieved without following subsequent adjustment or setting. By using a collapsing core, the at least one valve seat can be manufactured integrally with the valve housing in spite of the undercut.

According to one exemplary embodiment of the method, the collapsing core forms at least one valve seat with an annular elevation that forms a planar abutment surface for a sealing diaphragm that partially surrounds the valve closing body. As a result of the collapsing core, an annular sealing edge is formed at the elevation, which edge projects axially into the receiving space. The annular elevation forms a surface bearing for the sealing diaphragm and thus a stop which limits the pivotability of the valve closing body. The sealing edge projecting from the annular elevation can be pressed into the sealing diaphragm when the sealing diaphragm abuts against the annular elevation, resulting in a high tightness of the fluid valve.

According to one exemplary embodiment, the collapsing core is used to form an opening of the receiving space provided on the outside of the valve housing, which opening has a rotationally asymmetric circumferential shape. The rotational asymmetry ensures that, on the one hand, the drive unit must be applied to the valve housing in a predetermined orientation and, on the other hand, the sealing diaphragm can also be inserted into the valve housing only in a defined rotary position so that its orientation relative to the at least one valve seat is defined. This can reduce assembly inaccuracies that would reduce the sealing quality of the fluid valve.

In the sense of the present disclosure, the expressions "approximately", "substantially," or "about" mean deviations from the respective exact value by +/−5-10% and/or deviations in the form of changes that are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 shows by way of example a longitudinal sectional view of a fluid valve;

FIG. 2 shows by way of example a perspective view of a valve housing;

DETAILED DESCRIPTION

Figure 3:
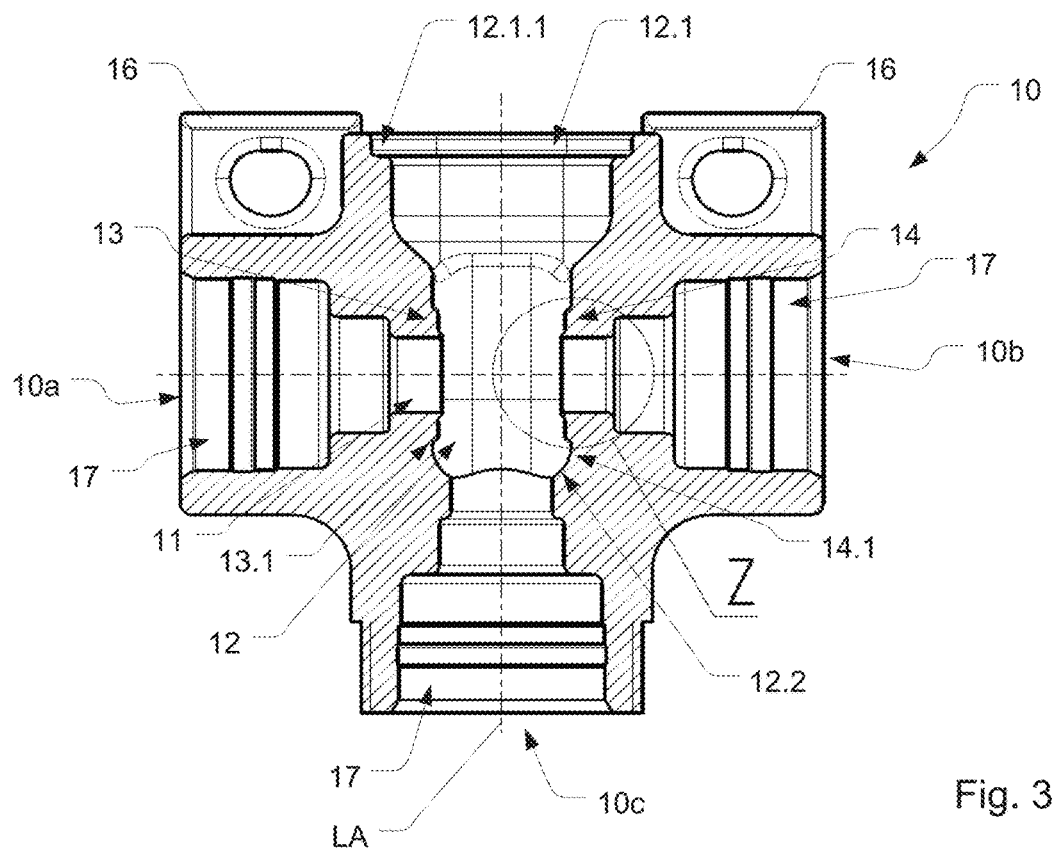
FIG. 3 shows by way of example a longitudinal sectional view centrally through the valve housing illustrated in FIG. 2.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

FIG. 1 shows, by way of example and schematically, a longitudinal sectional view centrally through a fluid valve 1 having a valve housing 10.

The fluid valve 1 comprises a drive unit 3 for a valve closing body 2 and a valve housing 10, in which at least one fluid channel 11 is provided. The valve closing body 2 extends into the valve housing 10 and is coupled to the drive unit 3 in such a way that the valve closing body 2 can be moved, in particular pivoted, by the drive unit 3. In particular, the valve closing body 2 can assume a first and a second pivot position in order to release or close a valve opening 10.1 depending on the pivot position. In the illustrated exemplary embodiment, the valve housing 10 has three ports 10a, 10b, 10c, a pair of ports 10a, 10b, 10c being fluidly connected to one another in each case depending on the pivot position of the valve closing body 2. Deviating from this, however, the fluid valve 1 can also have only two ports 10a, 10b, 10c, a fluidic connection between the two ports being released or not, depending on the pivot position of the valve closing body 2. The valve housing 10 can have a support 17 for a hose quick coupling at each of the ports 10a, 10b, 10c. The hose quick coupling can be configured in such a way that a free end of a hose can be inserted into the hose quick coupling thereby forming a fluid-tight connection between the interior of the hose and the fluid channel 11 formed in the valve housing 10. The hose quick coupling can also include securing elements against unwanted detachment of the hose from the hose quick coupling.

The fluid valve 1 has the following functionality: the drive unit 3 is designed to influence the pivot position of an armature 5. The drive unit 3 is, for example, an electromagnetic drive unit, i.e., when a coil 4 of the drive unit 3 is energized, a magnetic force is generated by means of which the armature 5 is moved from a second pivot position to a first pivot position. This first pivot position is shown in FIG. 1. This first pivot position is held as long as the coil 4 is energized. The armature 5 can be spring-loaded by means of a spring in such a way that it is returned to the second pivot position after the current flow through the coil 4 has ended.

As shown in FIG. 1, the valve closing body 2 is coupled to the armature 5 in such a way that the valve closing body 2 is moved, in particular pivoted, by the armature 5. In particular, the valve closing body 2 assumes a first or second position in the valve housing 10 depending on the pivot position of the armature 5 and thus defines the valve position, respectively, the release or closing of at least one fluid channel 11.

The drive unit 3 comprises, for example, a main body 6. The main body 6 forms the supporting basic structure of the drive unit 3. It can be designed as an injection-molded part, in particular as a plastics injection-molded part. The main body 6 has a tubular or substantially tubular support for the coil 4. A first insertion opening is formed within the support, into which a leg of a U-shaped core 7 can be inserted.

The main body 6 further comprises an armature support 6.1. This armature support 6.1 directly adjoins the support of the coil 4 and is designed to pivotably mount the armature 5. The armature support 6.1 is of box-like, in particular of rectangular box-like, design and has a bottom region and a plurality of wall regions. The wall regions are connected to the bottom region, surround the bottom region circumferentially and project from the bottom region to a side facing away from the coil 4.

A second insertion opening is provided in the bottom region, into which a second leg of a U-shaped core 7 is insertable. The U-shaped core 7 is thus yoke-shaped, one leg of the core 7 being surrounded by the coil 4 so that when the coil 4 is energized a closed magnetic circuit is formed by the core 7 and the armature 5 spanning the pole faces 7.1, 7.1' of the core 7.

A valve housing carrier 8 is provided on the armature support 6.1 on the side facing away from the core 7 or coil 4. The valve housing carrier 8 is configured to establish the connection between the drive unit 3 and the valve housing 10. The valve housing carrier 8 is connected, for example, to the wall of the armature support 6.1 and, in particular, closes the armature support 6.1, which is formed in the manner of a box, apart from a lead-through opening for the valve closing body 2.

The valve housing carrier 8 has fastening members by means of which the valve housing 10 can be detachably fastened to the drive unit 3. As is in particular clear from FIG. 2, the valve housing 10 has, for example, a plurality of lug-like coupling portions 16 which interact with detent lugs on the valve housing carrier 8 and are used to establish a snap connection to the valve housing carrier 8. An inversely designed fixation is also conceivable in principle, i.e., that the coupling portions 16 are provided on the valve housing carrier 8 and interact with detent lugs of the valve housing 10.

FIG. 3 shows a sectional view centrally through the valve housing 10 shown in FIG. 2, namely in such a way that a longitudinal section through the fluid channels 11 formed in the valve housing 10 is created.

In the valve housing 10, a pair of ports 10a, 10b is provided diametrically opposite one another and another port 10c is provided below and opposite the opening 12.1 of the receiving space 12. In this exemplary embodiment, a fluid communication can be established between either the ports 10a and 10c or the ports 10b and 10c depending on the position of the valve closing body. Here, the fluid valve 1 forms a fluid switch in which the port 10c acting as an inlet is coupled to either the port 10a or the port 10b as an outlet, or in which the port 10c acting as an outlet is coupled to either the port 10a or the port 10b as an inlet.

In an alternative exemplary embodiment, the port 10b can be omitted so that either the fluid channel between the ports 10a and 10c is open or closed by the fluid valve 1—depending on the switching state.

In the illustrated exemplary embodiment, the valve closing body 2 has two legs 2.1, 2.2. The first leg 2.1 projects into the receiving space 12. A second leg 2.2 can be oriented obliquely, in particular at right angles or substantially at right angles to the first leg, and connects the valve closing body 2 to the armature 5.

The first leg 2.1 is surrounded by a sealing diaphragm 15 in some portions and in particular in the region of its free end. The sealing diaphragm 15 is used, on the one hand, as a sealing element for sealing the valve opening 10.1 and, on the other hand, for sealing the opening 12.1 of the receiving space 12 towards the drive unit 3. The sealing diaphragm 15 is hat-shaped, as shown in FIG. 1. In particular, it can be of closed design on the circumference in the lower region extending into the receiving space 12 and may have a shape adapted to the free end of the first leg 2.1 of the valve closing body 2 so that the free end of the first leg 2.1 is received in the sealing diaphragm 15 with an accurate fit.

At least one valve seat 13, 14 is provided in the receiving space 12. The valve seat 13, 14 can be provided on the side wall of the receiving space 12, which runs parallel or substantially parallel to the longitudinal axis LA of the receiving space 12. In the illustrated exemplary embodiment, a pair of valve seats 13, 14 is provided on opposite side walls of the receiving space 12 such that a first valve seat 13 is located opposite a second valve seat 14 in a diametrical fashion and in the same height position.

The valve housing 10 is integrally formed as an injection molded part, in particular as a plastics injection molded part. The at least one valve seat 13, 14 projects into the receiving space 12 in such a way that an undercut 13.1, 14.1 is formed by the valve seat 13, 14. The at least one valve seat 13, 14 protrudes into the receiving space 12 in a direction transverse, specifically perpendicular or essentially perpendicular to the longitudinal axis LA of the receiving space 12 which runs through the opening 12.1. The undercut 13.1, 14.1 is here provided in the lower region 12.2 of the receiving space 12 and below the valve seats 13, 14 opposite the opening 12.1.

Figure 4:
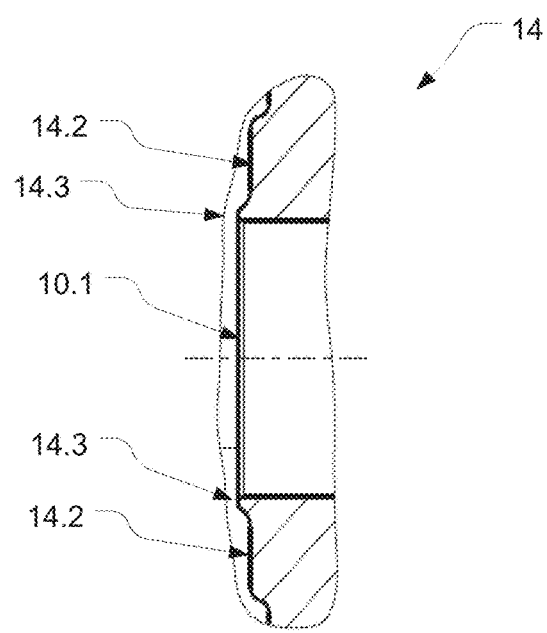
FIG. 4 shows by way of example a detailed view of the area marked Z in FIG. 3 to illustrate the valve seat.
Figure 5:
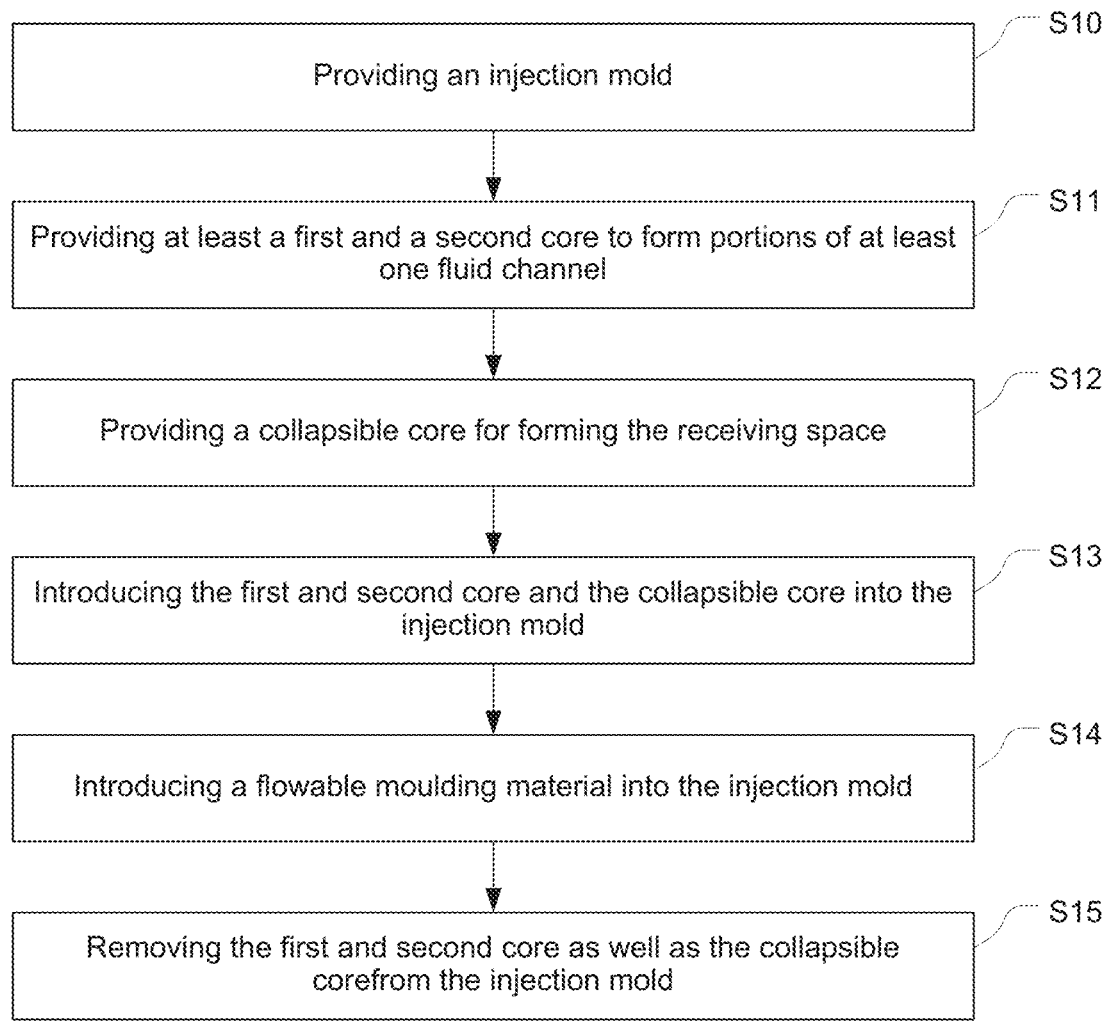
FIG. 5 shows a flow chart which illustrates the steps for producing a valve housing by means of an injection molding process.

FIG. 4 shows the design of the second valve seat 14 in more detail. It should be noted that the first valve seat 13 can be identical to the second valve seat 14. The valve seat 14 has an elevation 14.2, which is annular, in particular has the shape of a circular ring, and projects from the side wall into the receiving space 12. The valve opening 10.1 is provided within the elevation 14.2 which has the shape of a circular ring and, when the valve closing body 2 provided with the sealing diaphragm 14 abuts, is closed in fluid-tight fashion by the valve closing body 2.

The elevation 14.2 forms a flat abutment for the sealing diaphragm 15 or the valve closing body 2 so that the valve closing body 2 is limited in its pivot travel by the elevation 14.2.

In some embodiments, the armature 5 is held in the armature support 6.1 without a stop, i.e., the pivoting movement of the armature 5 is not limited in either the first or the second pivot position by an abutment of an armature portion against components surrounding the armature 5. The pivoting movement of the armature 5 is rather limited by the valve closing body 2, which, depending on the pivot position of the armature 5, comes into abutment against the valve seats 13, 14 or, in the case where only one valve seat is provided, against a stop in the valve housing 10 opposite this valve seat. It should be noted that also in the second pivot position of the armature 5, which is assumed when current flows through the coil 4, the armature 5 is spaced from the pole faces 7.1, 7.1'. The distance can be less than 1 mm, in particular less than 0.5 mm, in order to achieve the highest possible force introduction into the armature 5.

A sealing edge can be provided on the elevation 14.2 and is designed to be pressed into the sealing diaphragm 15 when the sealing diaphragm 15 abuts against the elevation 14.2. This ensures a high tightness of the valve opening 10.1 closed by the valve closing body 2.

As is in particular apparent in FIG. 2, the opening 12.1, via which the valve closing body 2 projects into the receiving space 12, has an abutment surface for the sealing diaphragm 15 on the inside. The sealing diaphragm 15 has a base area 15.1 and corresponds on the outer circumferential side to the circumferential shape of the opening 12.1. In addition, the valve housing carrier 8 has an extension 8.1, which abuts with its outer side against the inner wall of the base area 15.1 of the sealing diaphragm 15. The extension 8.1 has its shape adapted to the base area 15.1 and the opening 12.1 in such a way that, in the base area 15.1, the sealing diaphragm 15 is pressed radially against the edge 12.1.1 of the opening, thus sealing the receiving space 12 at the transition between the valve housing 10 and the valve housing carrier 8.

The opening 12.1 can have a rotationally asymmetric circumferential shape on the inside. This ensures that the sealing diaphragm 15 can only be inserted into the receiving space 12 at a defined installation position or rotary orientation so as to ensure the flat contact pressure of the sealing diaphragm 15 against the at least one valve seat 13, 14 by means of the valve closing body 2.

The production of the valve housing 10 by means of an injection molding process is explained in more detail below.

As explained above, the at least one valve seat 13, 14 or the stop (should only one valve seat be provided and the pivoting movement of the valve closing body 2 be limited by a stop on the side opposite the valve seat) projects into the receiving space 12 so that undercuts 13.1, 14.1 are formed. The at least one valve seat 13, 14 or the stop are integrally provided on the injection-molded part, i.e., are produced at the same time as the other portions of the valve housing 10. Thus, the undercuts 13.1, 14.1 are also formed by the injection molding process.

Cores are used to produce the ports 10a, 10b, 10c and the receiving space 12 and are inserted into the injection mold to form the respective portions of the at least one fluid channel 11 and/or the receiving space 12. The core used to form the receiving space 12 is configured as a collapsing core. In this context, "collapsing" means that, after the injection molding process has been carried out and the molding material has been cured, the core is initially changed in shape and is thus reduced in size on the outer circumferential side in such a way that it can be pulled out of the receiving space 12 despite the undercuts 13.1, 14.1.

The collapsing core has a recess on diametrically opposite sides in each case, which is used to produce the at least one valve seat 13, 14 and/or the stop. The recess for producing the at least one valve seat 13, 14 has, for example, a shape which is inverse to the above described shape of the valve seat 13, 14. In particular, the recess is configured to form the annular elevation 14.2 and the sealing edge 14.3 projecting therefrom.

In addition, the collapsing core is also configured to form the rotationally asymmetric circumferential shape of the opening 12.1 of the receiving space 12.

The steps of the method for manufacturing the valve housing 10 are described in more detail below:

First, an injection mold (S10) and a first and second core (S11) provided for forming portions of at least one fluid channel in the valve housing are provided.

Furthermore, a collapsing core is provided to form the receiving space (S12). The collapsing core has at least one recess for producing at least one valve seat in the receiving space.

Subsequently, the first and second core and the collapsing core are inserted into the injection mold. The first and/or second core here interacts with the collapsing core in such a way that the free end of the first core is oriented towards the recess of the collapsing core (S13).

A flowable molding material is then introduced into the injection mold (S14).

After the curing of the molding material, the first and second core and the collapsing core are removed from the injection mold after the size reduction of the collapsing core (S15).

The present disclosure has been described above with reference to exemplary embodiments. It is understood that numerous modifications as well as variations are possible without leaving the scope of protection defined by the claims.

LIST OF REFERENCE SIGNS 1 fluid valve
2 valve closing body
2.1 first leg
2.2 second leg
3 drive unit
4 coil
5 armature
6 main body
6.1 armature support
7 core
7.1, 7.1' pole face
8 valve housing carrier
8.1 extension
10 valve housing
10a, b, c port
10.1 valve opening
11 fluid channel
12 receiving space
12.1 opening
12.1.1 edge
12.2 lower region
13 first valve seat
13.1 undercut
14 second valve seat
14.1 undercut
14.2 annular elevation
14.3 sealing edge
15 sealing diaphragm
15.1 base area
16 coupling portion
17 support
LA longitudinal axis of the receiving space In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A valve housing for a fluid valve, the valve housing comprising:
at least one fluid channel through which a fluid can flow;
a receiving space for a valve closing body movable in the valve housing, wherein the receiving space has an opening configured to permit the valve closing body to pass therethrough and into the receiving space of the valve housing, the receiving space having a plurality of side walls; and
at least a first valve seat formed in the receiving space, the first valve seat having:
an annular elevation projecting from a first side wall of the plurality of side walls into the receiving space and forming a planar abutment surface for a sealing diaphragm surrounding the valve closing body, the annular elevation forming an undercut in the receiving space with respect to the first side wall; and
an annular sealing edge projecting axially from the planar abutment surface into the receiving space, wherein the valve housing is an integral injection-molded part, wherein the at least one valve seat is integrally formed at the valve housing.

2. The valve housing of claim 1, wherein either a second valve seat or a stop for the valve closing body is diametrically opposite the first valve seat in the receiving space.

3. The valve housing of claim 2, wherein the second valve seat or the stop for the valve closing body projects into the receiving space to form at least one undercut in the receiving space by the second valve seat or the stop with respect to a second side wall of the plurality of side walls.

4. The valve housing of claim 1, wherein the undercut is provided at a lower region of the receiving space away from the opening.

5. The valve housing of claim 2, wherein the planar abutment surface is perpendicular to a central axis of the annular elevation, the planar abutment surface configured to interface with a sealing diaphragm at least partially surrounding the valve closing body.

6. The valve housing of claim 1, wherein the annular sealing edge is provided at the radially inner edge of the annular elevation.

7. The valve housing of claim 1, wherein an edge of the opening of the receiving space forms a radial sealing surface which is provided for the abutment of a base area of a sealing diaphragm which is used to seal the opening to the outside.

8. The valve housing of claim 1, wherein the opening has a rotationally asymmetric circumferential shape.

9. The valve housing of claim 1, wherein the valve housing has coupling portions by which the valve housing can be releasably fastened to a drive unit, the drive unit being configured to move the valve closing body.

10. The valve housing of claim 9, wherein the coupling portions are configured for fastening the valve housing to the drive unit by a snap mechanism.

11. The valve housing of claim 1, wherein the valve housing has at least one support for a hose quick coupling.

12. A fluid valve, comprising:
a valve housing according to claim 1; and
a magnetic drive unit for a valve closing body movable in the valve housing.

* * * * *

UNITED STATES PATENT AND TRADEMARK OFFICE
CERTIFICATE OF CORRECTION

PATENT NO. : 12,352,364 B2
APPLICATION NO. : 18/145773
DATED : July 8, 2025
INVENTOR(S) : Rainer Fisch Page 1 of 1

It is certified that error appears in the above-identified patent and that said Letters Patent is hereby corrected as shown below:

In the Claims

| Column(s) | Line(s) | |
|---|---|---|
| 11 | 10 | Claim 3, delete "by the second valve seat or the stop" |

Signed and Sealed this
Ninth Day of September, 2025

Coke Morgan Stewart
*Acting Director of the United States Patent and Trademark Office*